United States Patent
Boonekamp et al.

(10) Patent No.: US 11,241,849 B2
(45) Date of Patent: Feb. 8, 2022

(54) 3D PRINTED REFLECTOR AND METHOD FOR ITS MANUFACTURE

(71) Applicant: SIGNIFY HOLDING B.V., Eindhoven (NL)

(72) Inventors: Erik Paul Boonekamp, Eindhoven (NL); Paulus Albertus Van Hal, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 253 days.

(21) Appl. No.: 16/313,878

(22) PCT Filed: Jun. 7, 2017

(86) PCT No.: PCT/EP2017/063843
§ 371 (c)(1),
(2) Date: Dec. 27, 2018

(87) PCT Pub. No.: WO2018/001690
PCT Pub. Date: Jan. 4, 2018

(65) Prior Publication Data
US 2019/0160769 A1 May 30, 2019

(30) Foreign Application Priority Data
Jul. 1, 2016 (EP) .................................... 16177410

(51) Int. Cl.
*B29D 11/00* (2006.01)
*B33Y 80/00* (2015.01)
(Continued)

(52) U.S. Cl.
CPC ...... *B29D 11/00605* (2013.01); *B29C 64/106* (2017.08); *B29C 64/112* (2017.08);
(Continued)

(58) Field of Classification Search
CPC B29D 11/00605; G02B 5/13; G02B 19/0061; G02B 19/0028; G02B 5/136;
(Continued)

(56) References Cited

U.S. PATENT DOCUMENTS

| | | | |
|---|---|---|---|
| 2011/0051252 A1* | 3/2011 | Poulsen | B29D 11/00605 359/624 |
| 2014/0268871 A1* | 9/2014 | Morgan | G02B 19/0042 362/607 |
| 2015/0343673 A1 | 12/2015 | George | |

FOREIGN PATENT DOCUMENTS

| | | |
|---|---|---|
| CN | 1912681 A | 2/2007 |
| CN | 1938634 A | 3/2007 |

(Continued)

OTHER PUBLICATIONS

Shane Taylor: New Remarkably Transparent FDM 3D Prints, 3D Printing Industry, Sep. 11, 2014, XP002765153, URL:https://3dprintingindustry.com/news/transparent-3d-prints-taulman-37895/.

(Continued)

*Primary Examiner* — Robert E. Tallman
(74) *Attorney, Agent, or Firm* — Daniel J. Piotrowski

(57) ABSTRACT

The invention provides a reflector (2) comprising a reflector wall (20), the reflector wall (20) comprising a first wall surface (22) and a second wall surface (23) defining said reflector wall (20), the reflector wall (20) comprising a light transmissive material (21), wherein the reflector wall (20) has a first dimension (d1) and a second dimension (d2) defining a first reflector wall area, wherein each wall surface (22,23) comprises a plurality of parallel arranged elongated corrugations (210), wherein the corrugations have corrugation heights (h2) relative to recesses (220) between adjacent corrugations (210) and corrugation widths (w2) defined by the distance between adjacent recesses (220) at the respec- (Continued)

tive wall surfaces (22,23), wherein the corrugations (210) have curved corrugation surfaces (230) between said adjacent recesses (220) having corrugation radii (r2) at the respective wall surfaces (22,23), and wherein over at least part of one of the first dimension (d1) and the second dimension (d2) one or more of (i) the corrugation heights (h2), (ii) the corrugation widths (w2), (iii) the corrugation radii (r2), and (iv) a shortest top-top distance (w12) of corrugations tops (211) configured at different wall surfaces (22,23) vary over said wall dimension (d1,d2) for at least one of the wall surfaces (22,23). The reflector (2) has a first end (3) and a second end (4), wherein a third distance (d3) between the first end (3) and the second end (4) is bridged by one or more reflector walls (20), wherein the one or more reflector walls (20) are configured tapering from the second end (4) to the first end (3), and wherein the reflector (2) has a reflector cavity (5).

10 Claims, 14 Drawing Sheets

(51) Int. Cl.
| | | |
|---|---|---|
| *B33Y 70/00* | (2020.01) | |
| *G02B 5/13* | (2006.01) | |
| *G02B 19/00* | (2006.01) | |
| *G02B 5/136* | (2006.01) | |
| *B29C 64/106* | (2017.01) | |
| *B29C 64/112* | (2017.01) | |
| *B29C 64/209* | (2017.01) | |
| *G02B 5/02* | (2006.01) | |
| *B29K 69/00* | (2006.01) | |

(52) U.S. Cl.
CPC ............ *B29C 64/209* (2017.08); *B33Y 70/00* (2014.12); *B33Y 80/00* (2014.12); *G02B 5/13* (2013.01); *G02B 5/136* (2013.01); *G02B 19/0028* (2013.01); *G02B 19/0061* (2013.01); *B29K 2069/00* (2013.01); *G02B 5/0215* (2013.01)

(58) Field of Classification Search
CPC ... G02B 5/0215; B29C 64/106; B29C 64/112; B29C 64/209; B33Y 80/00; B33Y 70/00; B29K 2069/00
See application file for complete search history.

(56) References Cited

FOREIGN PATENT DOCUMENTS

| | | | |
|---|---|---|---|
| CN | 104999180 | A | 10/2015 |
| EP | 1355108 | A2 | 10/2003 |
| EP | 2924351 | A1 | 9/2015 |
| WO | 2005050264 | A2 | 6/2005 |
| WO | 2016101942 | A1 | 6/2016 |
| WO | 2017062857 | A1 | 4/2017 |

OTHER PUBLICATIONS

John Klein et al: "Additive manufacturing of Optically Transparent Glass", 3D Printing and Additive Manufacturing, vol. 2, No. 3, Sep. 21, 2015, pp. 92-105, XP055328426, DOI: 10.1089/3DP.2015.0021.

\* cited by examiner

3D PRINTED REFLECTOR AND METHOD FOR ITS MANUFACTURE

CROSS-REFERENCE TO PRIOR APPLICATIONS

This application is the U.S. National Phase application under 35 U.S.C. § 371 of International Application No. PCT/EP2017/063843, filed on Jun. 7, 2017 which claims the benefit of European Patent Application No. 16177410.4, filed on Jul. 1, 2016. These applications are hereby incorporated by reference herein.

FIELD OF THE INVENTION

The invention relates to a method for manufacturing a 3D item. The invention also relates to the 3D (printed) item obtainable with said method. Further, the invention relates to a software product that can be used to execute such method. Yet further, the invention relates to a lighting system including such 3D (printed) item.

BACKGROUND OF THE INVENTION

Additive manufacturing parts of optical systems is known in the art. US20150343673 A1, for instance, describes a method of manufacturing an optical-element, comprising (a) printing at least a part of a mold via additive manufacturing technology, (b) depositing a nanocomposite-ink at one or more voxels within the mold, (c) selectively curing the deposited nanocomposite-ink, and (d) repeating at least steps (b) through (d) until the mold is appropriately filled and cured. The mold is made from a plastic. In embodiments, the mold incorporates an optical insert. The optical insert is incorporated during the 3D-printing process. An example of the optical-element is a simple plano-convex lens with plano surface and convex surface.

SUMMARY OF THE INVENTION

Within the next 10-20 years, digital fabrication will increasingly transform the nature of global manufacturing. One of the aspects of digital fabrication is 3D printing. Currently many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three dimensional object. FDM printers are relatively fast and can be used for printing complicated object.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc. Specific examples of materials that can be used can e.g. be selected from the group consisting of acrylonitrile butadiene styrene (ABS), polylactic acid (PLA), polycarbonate (PC), polyamide (PA), polystyrene (PS), lignin, rubber, etc.

The term "3D printable material" may also refer to a combination of two or more materials. In general these (polymeric) materials have a glass transition temperature $T_g$ and/or a melting temperature $T_m$. The 3D printable material will be heated by the 3D printer before it leaves the nozzle to a temperature of at least the glass transition temperature (and in general at least the melting temperature). Hence, in a specific embodiment the 3D printable material comprises a thermoplastic polymer having a glass transition temperature ($T_g$) and/or a melting point ($T_m$), and the heating in the printer head comprises heating the 3D printable material above the glass transition, and if it is a semi-crystalline polymer above the melting temperature. In yet another embodiment, the 3D printable material comprises a (thermoplastic) polymer having a melting point ($T_m$), and the heating in the printer head comprises heating the 3D printable material to be deposited on the receiver item to a temperature of at least the melting point. The terms "melting point" and "melting temperature" refer to the same.

The receiver item can also be heated during 3D printing. Especially, the receiver item can be a building platform or can be comprised by the building platform.

FDM printers are relatively fast, low cost and can be used for printing complicated 3D objects. Such printers are used in printing various shapes using various polymers. The technique appears to be useful in the production of LED luminaires and lighting solutions.

Incorporation of specular reflecting elements in 3D prints is interesting for creating a wide range of decorative effects. On the other hand, specular reflecting 3D prints can be used in functional reflector designs for LED luminaires. However, specular (mirror) effects are hard to make in FDM 3D printing technology. Experiments using aluminum flakes incorporated in the printing filament yields a silverish/grey material with a low reflectivity. Further, one may of course include non-3D printed optical elements in the 3D printed item. However, this may complicate product and does not allow using the 3D printing freedom and opportunities to be applied to the optical element.

Hence, it is an aspect of the invention to provide an alternative optical element, especially a (specular) reflector, which preferably further at least partly obviates one or more of above-described drawbacks. Yet further, it is an aspect of the invention to provide an alternative lighting system comprising such optical element, especially a reflector, which preferably further at least partly obviates one or more of above-described drawbacks. Further, it is an aspect of the invention to provide a method for providing such optical element, especially a reflector, which preferably further at least partly obviates one or more of above-described drawbacks.

The invention is related to the typical shapes that can be produced by FDM. In FDM, a polymer is heated and extruded through a fine nozzle. The nozzle moves with a certain speed and writes a "squeezed cylinder" of material on top of the previous one. In this way, a full 3D model is built up, layer by layer. The use of FDM essentially implicates that the structures, herein indicates as "ripples" or "corrugations", are always present on both sides of the printed surface and that these structures are always perfectly aligned. Each individual printed line can be tuned to have the desired optical performance by changing its shape or material property. This means that one can produce customized designs by changing the shape and/or material properties of each individual line without any additional tooling cost.

Unexpectedly, specular ("mirror") effects during 3D printing of structures using clear (e.g. PC, PET) materials were found. The occurrence of these specular reflection peaks (even reflectance >90%) may depend strongly on the angle of incidence, refractive index, and geometric parameters of the printed structures. This invention describes amongst others specific structures exhibiting strong specular reflection effects, which can e.g. be used in (LED based) lamp shades or reflectors.

A starting point is that 3D printed (FDM) structures exhibit a "rippled surface". Ripples in 3D printed objects are often considered as artifacts. However, these ripples appear to be exceptionally useful in the printing of clear materials because they act as biconvex cylinder lenses which are perfectly aligned in the 3D printing process. This invention describes free-form optical components consisting of an array of (3D printed) layers. Especially, by varying the optical properties of the lenses over larger areas a good reflectance may be obtained.

Hence, in a first aspect the invention provides a reflector comprising a reflector wall, the reflector wall comprising a first wall surface ("first reflector wall surface" or "first reflector surface") and a second wall surface ("second reflector wall surface" or "second reflector surface") defining said reflector wall, the reflector wall comprising a light transmissive material, wherein the reflector wall has a first dimension (d1) and a second dimension (d2) defining a first reflector wall area, wherein each wall surface comprises a plurality of parallel arranged elongated corrugations, wherein the corrugations have corrugation heights (h2) relative to recesses between adjacent corrugations (at the respective wall surfaces) and corrugation widths (w2) defined by the distance between adjacent recesses at the respective wall surfaces, wherein the corrugations have curved corrugation surfaces between said adjacent recesses having corrugation radii (r2) at the respective wall surfaces, and wherein in specific embodiments over at least part of one of the first dimension (d1) and the second dimension (d2) one or more of (i) the corrugation heights (h2), (ii) the corrugation widths (w2), (iii) the corrugation radii (r2), and (iv) a shortest top-top distance (w12) of corrugations tops configured at different wall surfaces vary over said wall dimension (d1,d2) for at least one of the wall surfaces, especially both wall surfaces. Furthermore, the reflector has a first end and a second end, wherein a third distance between the first end and the second end is bridged by one or more reflector walls, wherein the one or more reflector walls are configured tapering from the second end to the first end, and wherein the reflector has a reflector cavity.

Such reflector may be obtained with fused deposition modeling printing and may thus substantially have any shape. Further, the FDM printing technology allows a relative easy controlling of the dimensions of the filaments, and thus of the corrugation heights, corrugation widths, corrugation radii, and top-top distances, and thereby thus also controlling the reflective properties such as reflectance and distribution of the reflected light. A (non-imaging) substantially specular reflection may be obtained with the presently proposed 3D printed reflector. With such reflector, TIR may be optimized to provide highest specular reflection from a light source. This may especially include a gradient in one or more of the corrugation heights, corrugation widths, corrugation radii, and top-top distances over the reflector wall surfaces, especially such gradient in a single direction (parallel to one of the wall dimensions).

As indicated above, the invention provides a reflector comprising a reflector wall, the reflector wall comprising a first wall surface and a second wall surface (essentially) defining said reflector wall, the reflector wall comprising a light transmissive material. In general, the light source will be configured such, that only a single wall surface will directly receive the light source light. Hence, in embodiments one of the walls can be considered a back side and the other side may be considered a front side. The two sides in essence define a wall thickness. However, this thickness varies over one or more dimensions as both surfaces comprise corrugations. Hence, there may be minimal thicknesses (between corresponding corrugation recesses at the different reflector wall surfaces) and maximal thicknesses (between corresponding corrugation tops at the different reflector wall surfaces). Assuming e.g. a conical reflector, like a collimator, one surface may be the internal surface or cavity surface; the other surface may be external surface of the conical reflector. Herein, the wall surface(s) may also be indicated as reflector surface(s).

The wall comprises a light transmissive material. The light transmissive material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the matrix may comprise polyethylene terephthalate (PET). Hence, the light transmissive material is especially a polymeric light transmissive material. Even more especially, the reflector wall comprises one or more of PC, PET, PLA and PMMA. Especially, PC may be applied.

The wall may essentially consist of a single material or may comprise a plurality of different materials. In embodiments, the index of refraction may vary over at least one of the dimensions. Also a variation in the refractive index may be used to control the angular distribution of the reflected light.

Especially, the light transmissive material/reflector wall material is substantially transparent. Hence, the material may substantially not include scattering elements such as particles or grain boundaries. Especially, radiation in the visible provided perpendicular to the reflector wall and travelling from top to top (i.e. the longest pathway through the reflector wall) will be transmitted with at least 80%, such as at least 90%, like at least 95%, such as in the range of 97-100%.

The reflector wall includes corrugations at both sides, i.e. at both reflector wall surfaces. Further, the reflector wall may have a substantially flat overall shape (thus not taking into account the corrugations), i.e. a plane through the reflector wall may be a flat plane. For, instance, this may be the case in an embodiment wherein a reflector comprises at least two reflector walls as described herein, which are configured relative to each other with an angle in the range of larger than 0° and smaller than 180° to provide a V-shaped reflector, such as in the case of a V-shaped trough (hollow triangular shaped prism). Of course, the reflector may also have a trough type shape with curved reflector walls. In such instance in one dimension there may be a curvature. Optionally, the reflector wall(s) may include curvatures in two dimensions, such as in the case as a collimator type of reflector.

The reflector according to the first aspect of the invention has a first end and a second end, wherein a third distance between the first end and the second end is bridged by one or more reflector walls, wherein the one or more reflector walls are configured tapering from the second end to the first end, and wherein the reflector has a reflector cavity. This may apply to V-shaped reflectors, but also to e.g. reflectors having a substantially circular cross-section. Hence, in specific embodiments the reflector has an elongated V-shape or has a conical shape. Hence, the cavity may have a tapering shape (tapering from the second end to the first end).

Therefore, the reflector wall has a first dimension (d1) and a second dimension (d2) defining a first reflector wall area. This area may substantially be the same as an area (without taking into account all corrugations) of the first wall surface or of the second wall surface. This area may in embodiments especially be substantially identical to a cross-section area. The first and second dimensions may be selected from e.g. height and length, but may also be selected from e.g. height and circumference (circumferential length or perimeter). For instance, a conical shaped reflector, having a reflector wall (or reflector walls) only curved in one dimension and straight walls in the tapering direction has a length (tapering direction) and a circumference (which varies over the length). In the case of a hollow triangular shaped prism, the reflector walls each may have a length (or width) and height. The first dimension and second dimension may each independently be selected from the range of 2 mm-500 cm, especially at least one dimension being at least about 5 mm, such as at least about 200 cm. Hence, in specific embodiments one of the dimensions may vary with the other dimension (as may be the case with a cone); for instance the perimeter may vary with the height or length.

Each wall surface comprises a plurality of parallel arranged elongated corrugations. The term "plurality" implies at least 2. In general, there will be at least 4, such as at least 8, like at least 20, even more at least 100 corrugations. For instance, a reflector wall may comprise about 1-100 corrugations/cm over a first dimension, such as 5-100, like 10-80/cm. Hence, e.g. a 1*1 cm$^2$ wall surface may include 1-100 corrugations. Each corrugation may be provided by a filament, i.e. the elongated polymer that is deposited on the receiver element. The filaments for the first surface are provided parallel. The filaments for the second surface are provided parallel. Even more especially, corresponding corrugations at both wall surfaces may be provided by the same filament. The corrugations are configured parallel. This especially implies that the elongated corrugation tops (with heights h2) and the elongated corrugation recesses are configured parallel. Especially, at a single surface all corrugations are configured essentially parallel. Further, the corrugations at both surfaces may also be mutually parallel. As indicated above, the corrugations at different surfaces may be provided by the same filament. Hence, in specific embodiments, the reflector wall is a fused deposition modeling printed reflector wall. Yet further especially, the corrugations may be defined by filament surfaces. Especially, the corrugations are configured substantially parallel to one of the dimensions.

Further, the corrugations have corrugation heights (h2) relative to recesses between adjacent corrugations (at the respective wall surfaces) and corrugation widths (w2) defined by the distance between adjacent recesses at the respective wall surfaces. Here, for the sake of clarity the phrase "at the respective wall surfaces" is added, indicating that the height of the corrugations and the corrugation widths are defined for the corrugations at a specific surface and/or relative to the corrugations at the same surface. Hence, the corrugations at the first surface have corrugation heights (h2) relative to recesses between adjacent corrugations and corrugation widths (w2) defined by the distance between adjacent recesses. Likewise, the corrugations at the second surface have corrugation heights (h2) relative to recesses between adjacent corrugations and corrugation widths (w2) defined by the distance between adjacent recesses. The heights may vary over the surface. The heights at one surface may vary differently from the variation of the heights at the other (oppositely configured) surface. The heights of the first surface may differ from the heights of the second surface. However, the heights may also be (substantially) identical. Yet further, the heights may also vary (substantially) identically over the two surfaces. The corrugation heights may be selected from the range of about 20 μm-10 mm, such as in the range of about 40 μm-500 μm, like about 50 μm-250 μm. The corrugation widths may be in the range of about 20 μm-5 mm, such as in the range of 40 μm-2 mm, like in the range of 50 μm-1 mm.

The corrugations intrinsically may define the corrugation recesses. The corrugation cross-sections may especially be circle segments. Hence, the corrugations have curved corrugation surfaces between said adjacent recesses having corrugation radii (r2) at the respective wall surfaces. The corrugation radii may be in the range of about 20 μm-5 mm, such as in the range of 40 μm-2 mm, like in the range of 50 μm-1 mm. Especially, the radius over of a corrugation between one recess and the associated other recess is substantially constant. The variation in the radius relative to a mean radius may be in the range of +/−20%, especially +/−10%. For instance, some variation may be induced during manufacturing of the filter, such as due to the deposition of a next filament on a filament, etc.

The radii to two corrugation recesses of a corrugation also define an angle ($2\alpha$). This angle $2\alpha$ is the angle which the corrugation surface spans (in cross-section the circular segment with central angle). This angle $2\alpha$ will in general be in the range of 30-150°, especially in the range of 45-135°, such as 60-120°.

Especially, each corrugation at a first face has an accompanying corrugation at the second face. Hence, opposite of each other corrugations are configured. Hence, top-top distances can be defined and recess-recess distances can be defined. Virtual lines between oppositely arranged tops and oppositely arranged recesses may essentially be parallel and may essentially be perpendicular to a plane through the reflector wall. The top-top distances may be in the range of about 50 μm-10 cm, such as in the range of 100 μm-5 cm, like in the range of 150 μm-2 cm. Oppositely arranged corrugations are herein also indicated as "corresponding corrugations".

A light source generating rays of light towards the reflector wall provide rays that have a shorter path length to a wall surface and rays that have a longer path length to the (same) wall surface. Hence, the angles of incidence under which the rays arrive at the reflector surface will vary over the surface. With a conventional mirror, such as a flat aluminum based mirror, the angular dependence may substantially have no effect (on the reflectance). In the present invention however, at least part of the light rays have to enter the reflector wall and have to be reflected at the other surface to obtain the desired reflectance. Hence, the reflector wall may be optimized for coupling of light source light into the reflector wall at a surface, for reflection at the other surface, and for coupling out of the (reflected) light at again the former surface. To this end, the reflector wall may include some variations to optimize reflection. In embodiments, the reflector comprises a plurality of (elongated) biconvex cylinder lenses.

Hence, the reflector wall is especially optimized to provide reflection based on total internal reflection, wherein the optimization may further include an optimization of the reflector wall such that the reflection under different angles of incidence is optimized.

To this end, over the reflector wall, at both surfaces, there may be a gradient of one or more parameters as defined herein. Especially over at least part of one of the first dimension (d1) and the second dimension (d2) one or more of (i) the corrugation heights (h2), (ii) the corrugation widths (w2), (iii) the corrugation radii (r2), and (iv) a shortest top-top distance (w12) of corrugations tops configured at different wall surfaces may vary over said wall dimension (d1,d2) for at least one of the wall surfaces. Especially, one or more of these parameters vary over said dimension for both wall surfaces. Further, in general the variation as indicated here is only over one direction. It appeared that with such variation the reflection can further be optimized.

As indicated above, especially each corrugation at a first face has an accompanying corrugation at the second face (i.e. corresponding corrugation). Therefore, in specific embodiments the reflector comprises sets of corrugations with a first corrugation at the first wall surface and a second corrugation at the second wall surface. Good results may be obtained with said shortest top-top distance (w12) between a first corrugation top of the first corrugation at the first wall surface and a second corrugation top of the second corrugation at the second wall surface selected from the range of $0.01 \leq w2/w12 \leq 100$, such as $0.05 \leq w2/w12 \leq 5$, like $0.2 \leq w2/w12 \leq 2$.

As indicated above, over at least part of one of the first dimension (d1) and the second dimension (d2), especially over only one, one or more of (i) the corrugation heights (h2), (ii) the corrugation widths (w2), (iii) the corrugation radii (r2), and (iv) a shortest top-top distance (w12) of corrugations tops configured at different wall surfaces vary over said wall dimension (d1,d2) for at least one of the wall surfaces. However, over at least part of said dimension, one or more of these parameters corrugation height, corrugation width, corrugation radius and shortest top-top distance, especially all, may also be constant. Especially, over at least 20% of the dimension, such as over 2 mm of 10 mm high reflector, such as over at least 30%, such as in the range of 40-100, like 40-80% of the dimension one or more of these parameters vary. Assuming n corrugations at a face, especially there will be at least three subsets which mutually differ in one or more of these parameters, such as at least 5 subsets. Each subset may independently include one or more corrugations. Hence, at least 20% of the corrugations (at a wall surface), such as at least 30%, such as in the range of 40-100, like 40-80% of the corrugations mutually differ in one or more of these parameters. In this way, the reflector wall may be optimized to the desired angular distribution of the light. In embodiments, the parameter(s) that varies (vary) varies in a gradient (over said wall dimension). Herein terms like "vary", "gradually vary", and "gradient" may especially refer to a maximum, a minimum, and a plurality of (mutually differing) intermediate values, such as at least three intermediate (mutually differing) values.

The corrugations have (elongated) corrugations tops and are configured between (elongated) recesses. Especially, the variation in one or more parameters is in a direction perpendicular to those elongated structures.

Hence, the reflector as described herein may especially be used in combination with a light source to provide a lighting system. For instance, the reflector may be used to provide collimated light. The reflector may also be used to provide a side wall for a light mixing cavity.

Therefore, in a second aspect the invention provides a lighting system comprising a light source configured to provide light source light and a reflector according to the first aspect of the invention, wherein the reflector is configured to reflect at least part of the light source light (of the light source). In specific embodiments, the reflector is configured to collimate at least part of the light source light. The light source may be any light source, including a high pressure lamp, a halogen lamp, etc. etc. Especially, the light source comprises a solid state light source (such as a LED). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

As indicated above, the reflector may have different shapes which may facilitate the production of the desired light source light distribution with the reflector. Hence, in embodiments the reflector has a first end and a second end, wherein a third distance (d3) between the first end and the second end is bridged by one or more reflector walls, wherein the one or more reflector walls are configured tapering from the second end to the first end, and wherein the reflector has a reflector cavity. This may e.g. describe the hollow triangular shaped prism with at the narrow end the light source. This may also refer to collimator type of light source with the light source at the narrow end. Hence, in embodiments the light source comprises a light exit face, and the light exit face may be configured at the first end.

However, the present invention also allows other configurations, as the reflector wall is transmissive for light. Hence, the light source may also be configured to provide at least part, or even all, of the light source light not directly in a reflector cavity, but only via the reflector wall the light source light may reach the reflector cavity. Hence, in embodiments the light source may be configured to provide said light source light into said cavity through one or more reflector walls. Combinations of such embodiments may also be applied. Hence, in embodiments the light source may be configured external of a collimator comprising the reflector wall as reflective (collimator) wall.

As the reflector may have a light transmissive wall, part of the light source light may also escape via the reflector wall, e.g. dependent upon the angle of incidence and the (total) internal reflection. To optimize the reflector output, a further reflector may be applied to reflect light back to the reflector, such as back into the reflector cavity. This may be a similar type of reflector, but may especially be a state of the art specular reflector, such as based on aluminum. Hence, in yet further embodiments the lighting system may further comprising a second reflector configured to redirect at least part of light source light that escapes (from the cavity) through one or more reflector walls back through the one or more walls into said reflector cavity.

Good results in terms of printability and reflectivity may especially be obtained with r2, w2, and h2 selected from the range of 0.05-10 mm, especially 0.1-2 mm. In embodiments, two or three of r2, w2 and h2 are substantially identical. In yet other embodiments, two or three of r2, w2 and h2 are substantially different.

Further, good results in terms of printability and reflectivity may especially be obtained with w12 selected from the range of 0.1-5 mm.

Yet further good results in terms of printability and reflectivity may especially be obtained with $0.01 \leq w2/w12 \leq 100$, especially $0.01 \leq w2/w12 \leq 2$, even more especially $0.2 \leq w2/w12 \leq 2$. Especially $w2/w12 \leq 1$. For good specular reflectances especially, $0.2 \leq w2/w12 \leq 2$, even more especially $0.9 \leq w2/w12 \leq 1.1$.

It is further noted that h2 and r2 may be linked and may substantially be defined by the equation $h2=r2*(1-\cos(\alpha))$. It is further noted that w2 and r2 may also be linked and may substantially be defined by $w2=2*r2*\sin(\alpha)$.

In a third aspect, the invention provides a method for manufacturing a reflector. Especially, the invention provides a method for manufacturing a reflector that comprises a reflector wall, the reflector wall comprising a first wall surface and a second wall surface defining said reflector wall, the reflector wall comprising a light transmissive material, wherein the reflector wall has a first dimension and a second dimension defining a first reflector wall area, wherein each wall surface comprises a plurality of parallel arranged elongated corrugations, wherein the corrugations have corrugation heights relative to recesses between adjacent corrugations and corrugation widths defined by the distance between adjacent recesses at the respective wall surfaces, wherein the corrugations have curved corrugation surfaces between said adjacent recesses having corrugation radii at the respective wall surfaces. The method comprises providing a filament of 3D printable material and printing during a printing stage said 3D printable material on a receiver item (with a fused deposition modeling (FDM) 3D printer), to provide said reflector. Especially, the printing stage may comprise varying over at least part of one of the first dimension (d1) and the second dimension (d2) one or more of (i) the corrugation heights (h2), (ii) the corrugation widths (w2), (iii) the corrugation radii (r2), and (iv) a shortest top-top distance (w12) of corrugations tops configured at different wall surfaces over said wall dimension (d1,d2) for at least one of the wall surfaces, especially by controlling 3D printer method parameters. Such parameters may include the temperature at which the filament is heated in the printer head, the speed of deposition of the filament, the cross-sectional area and/or shape of the printer nozzle, etc.

In a design stage, a (virtual) light source with a (virtual) light source light distribution may be chosen and based on a desired light distribution and/or light flux, a reflector can be defined for e.g. a light source that may provide light source light corresponding to the chosen (virtual) light source. Hence, in specific embodiments the invention also provides a method comprising defining a desired distribution of light after reflection of light of a light source (having a light source light distribution) at a reflector surface, defining a design of a 3D printable reflector that meets best said desired distribution of light when combined with a light source (that meets best said light source light distribution), and printing said reflector in dependence of said design, wherein the printing stage may especially comprises controlling one or more of a deposition speed and a printer nozzle opening dimension (d4) for providing said variation over said wall dimension (d1,d2) for at least one of the wall surfaces. The printer nozzle opening dimension may refer to e.g. length and width or diameter(s). Especially, the nozzle opening may be circular (with a diameter) or substantially oval (with two diameters). For instance, when increasing the printer speed, the filament may be printed with a smaller diameter. Alternatively or additionally, when using a printer nozzle with a variable nozzle opening or when using different nozzles, also filaments with different dimensions may be printed. Amongst others in these ways the above indicated corrugation dimensions may be varied. Hence, a combination of light source and reflector can be simulated, wherein a desired light distribution after reflection can be tuned by designing the (virtual) reflector. Based on the designed (virtual) reflector, a real reflector (as described herein) can be printed (3D item) (as also described herein).

As also indicated above, in specific embodiments the reflector comprises sets of corrugations with a first corrugation (at the first wall surface) and a second corrugation (at the second wall surface) with said shortest top-top distance (w12) between a first corrugation top of the first corrugation at the first wall surface and a second corrugation top of the second corrugation at the second wall surface selected from the range of $0.01 \leq w2/w12 \leq 100$, wherein w2/w12 varies over said wall dimension (d1,d2) for at least one of the wall surfaces. In such embodiments, the method may especially comprise providing said variation in w2/w12 varying over said wall dimension (d1,d2) by controlling one or more of said deposition speed and said printer nozzle opening dimension (d4).

In yet a further aspect, the invention also provides a method for manufacturing a lighting system wherein the method comprises providing a light source and a reflector as defined herein and assembling (the light source and reflector) (in)to such lighting system. The reflector is especially configured in a light receiving relationship to the light source. Hence, the reflector and light source are assembled into a light providing and light receiving relationship. Note that not all light source light is necessarily directed to the reflector; in embodiments part of the light source light may also propagate from the light source without coming into contact with the reflector.

Further, downstream of the light source and/or reflector further optics may be configured, such as one or more of a lens, a light conversion element, an optical filter, etc. etc. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In yet a further aspect, the invention also provides a computer program product, which when loaded on a computer is capable of bringing about the method(s) as described herein. Such computer program product can be loaded on a computer comprised by a 3D printer. The computer program product may include a computer-readable medium. The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory. Additional memories may also be used. The computer-readable medium, The memory may be a long-term, short-term, or a combination of long- and short term memories. The term memory may also refer to memories. The memory may configure the processor/controller to implement the methods, operational acts, and functions disclosed herein. The memory may be distributed or local and the processor, where additional processors may be provided, may be distributed or singular. The memory may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network. The controller/processor and the memory may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi- purpose integrated circuit.

The lighting system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

Further, the reflector may be used in high bay luminaires, downlights, suspended luminaires, etc. etc.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
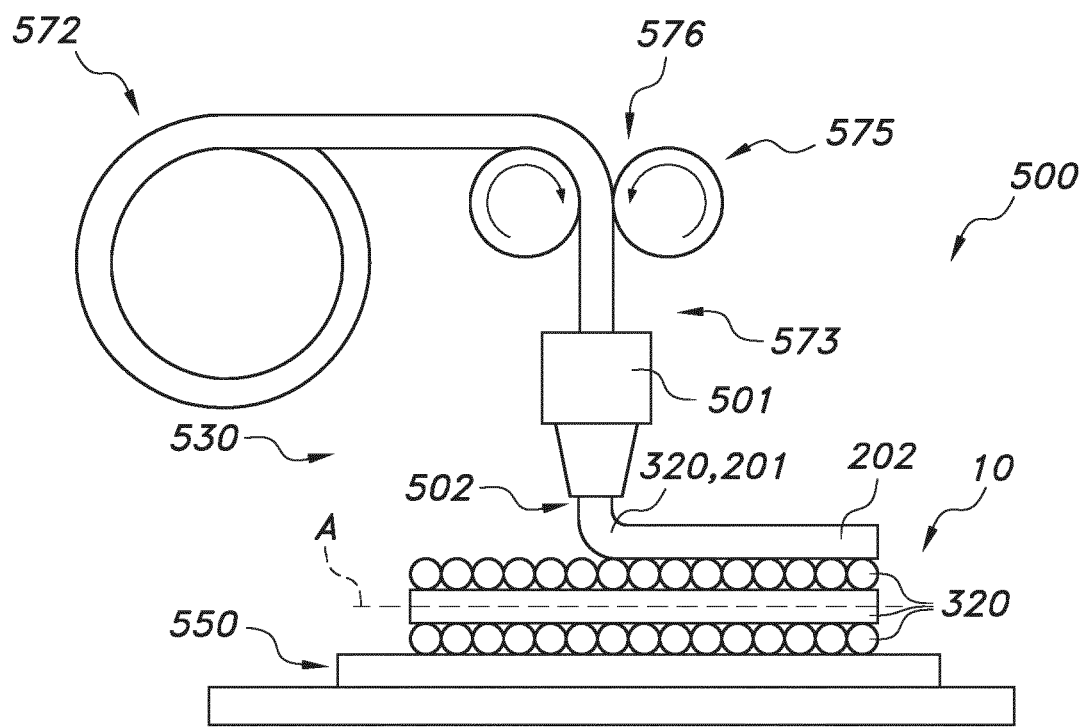
FIGS. 1a-1b schematically depict some general aspects of a 3D printer that may be used in the method described herein.

FIG. 1a schematically depicts some aspects of the 3D printer. Reference 500 indicates a 3D printer, herein also indicated as fused deposition modeling 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502).

The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Figure 1B:
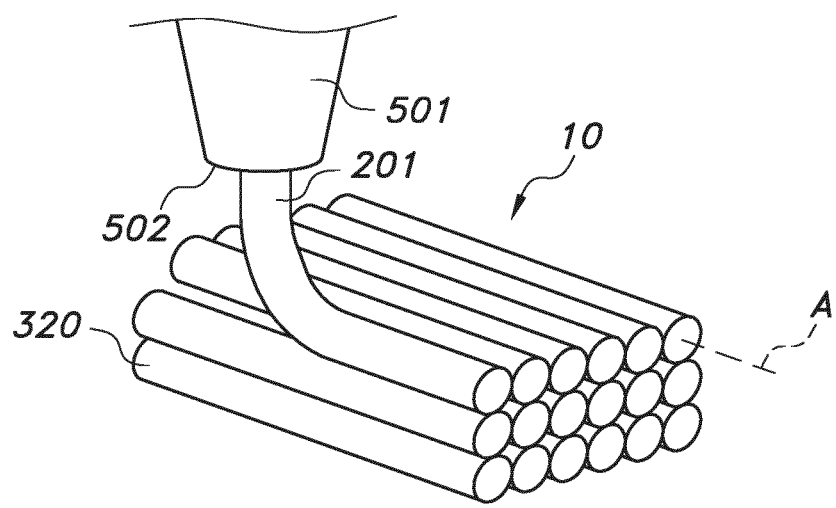

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550.

A 3D printed (FDM) structure exhibits a "rippled surface". These ripples surprisingly appear to be exceptionally useful in the printing of clear materials because they can act as biconvex cylinder lenses which are perfectly aligned in the 3D printing process. In all of these concepts, proper alignment of these linear structures is not trivial.

Figure 2A:
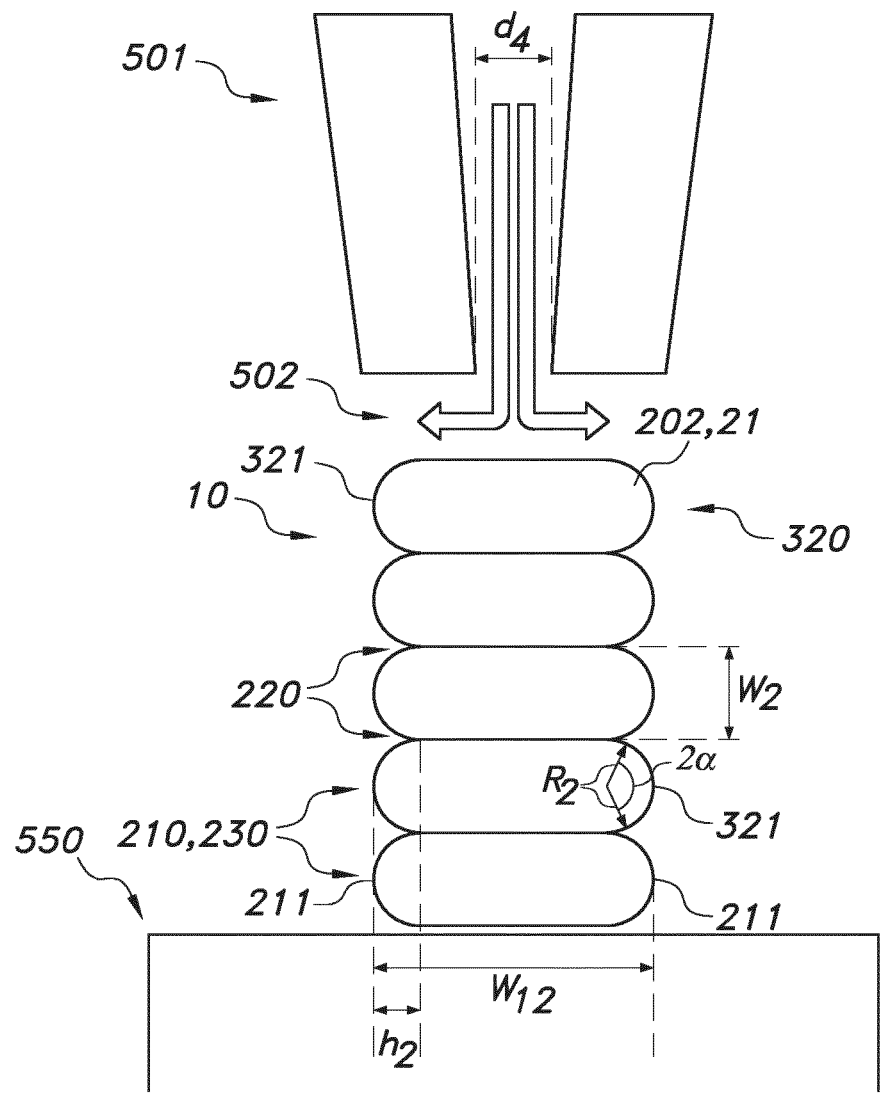
FIGS. 2a-2f schematically depict some aspects and variants of the reflector.

A 3D printing product is very schematically shown in FIG. 2a. This drawing may schematically depict the printer nozzle 501 of the 3D printer schematically depicted in FIG. 1a. The printer nozzle opening dimension is indicated with reference d4. In specific embodiments, the 3D printer 500 may have a variable printer nozzle opening dimension d4. In this way, the thickness or diameter of the printed filament may be controlled (during printing).

Figure 2B:
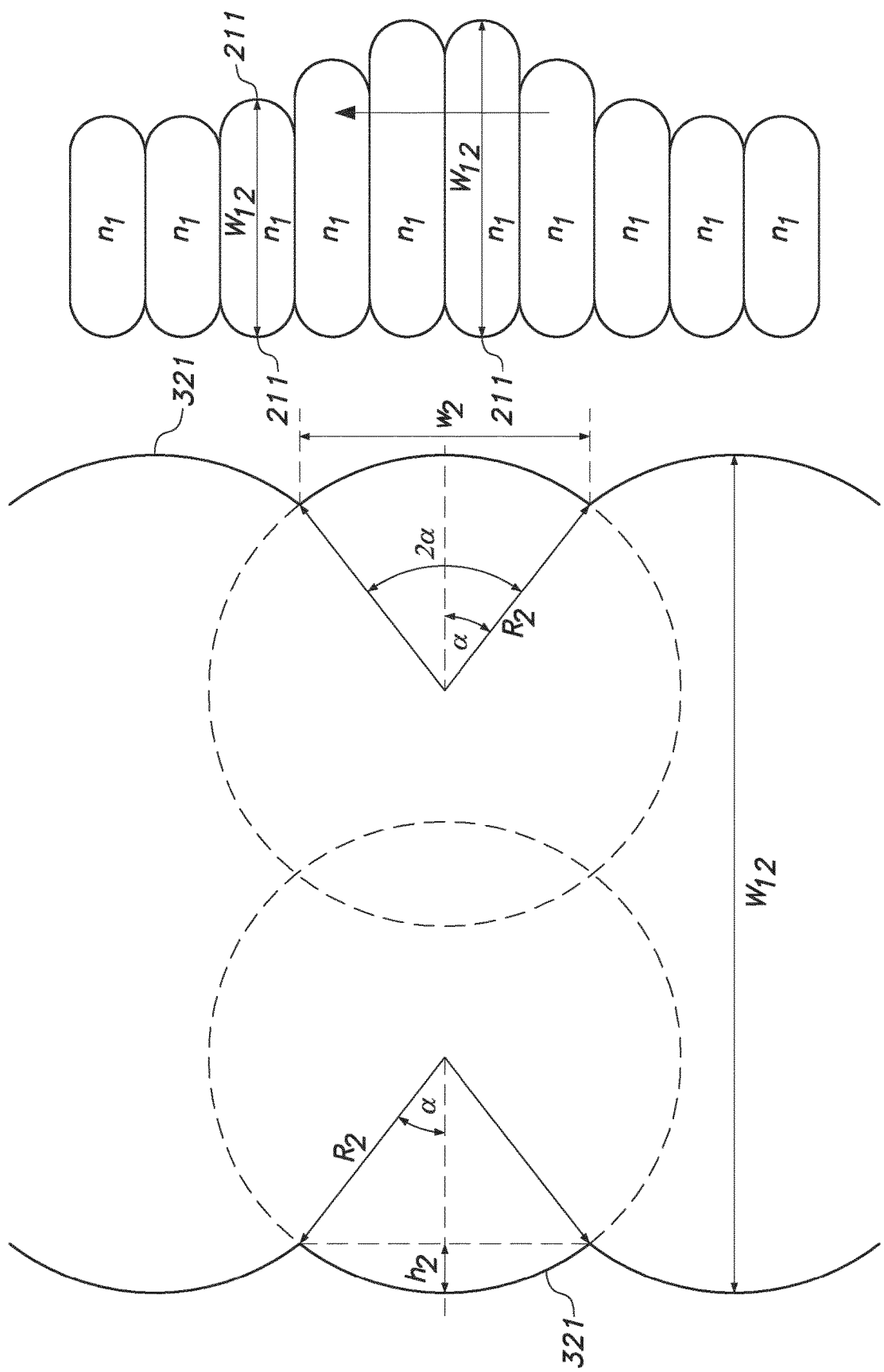

Geometric parameters in the design are amongst others the aspect ratio (w2/w12) of the layers and the curvature at the polymer/air interface. The parameters are explained in FIGS. 2a and 2b. The aspect ratio of the layers and curvature of the interfaces can be tuned by the processing conditions (printing speed, polymer flow) in the 3D printing process. Reference h2 indicates the corrugation height. The corrugations are indicated with reference 210. Reference w2 indicates a corrugation width and reference R2 indicates a radius of curved corrugation surfaces 230. Angle 2α is the angle which the corrugation surface 230 spans (in cross-section the circular segment with central angle), which will in general be in the range of 30-150°, especially in the range of 45-135°, such as 60-120°. Reference w12 indicates the width or length between two corrugation tops. The corrugation tops are indicated with reference 211. The corrugations 210 are provided by filament surfaces 321. Tops 211 defining w12 are herein also indicated as "corresponding corrugation tops". The variation in one or more parameters is in a direction perpendicular to the elongated structures. This is by way of example in this drawing indicated with the arrow (note that the variation itself is here in w12, the top-top distance).

Figure 2C:
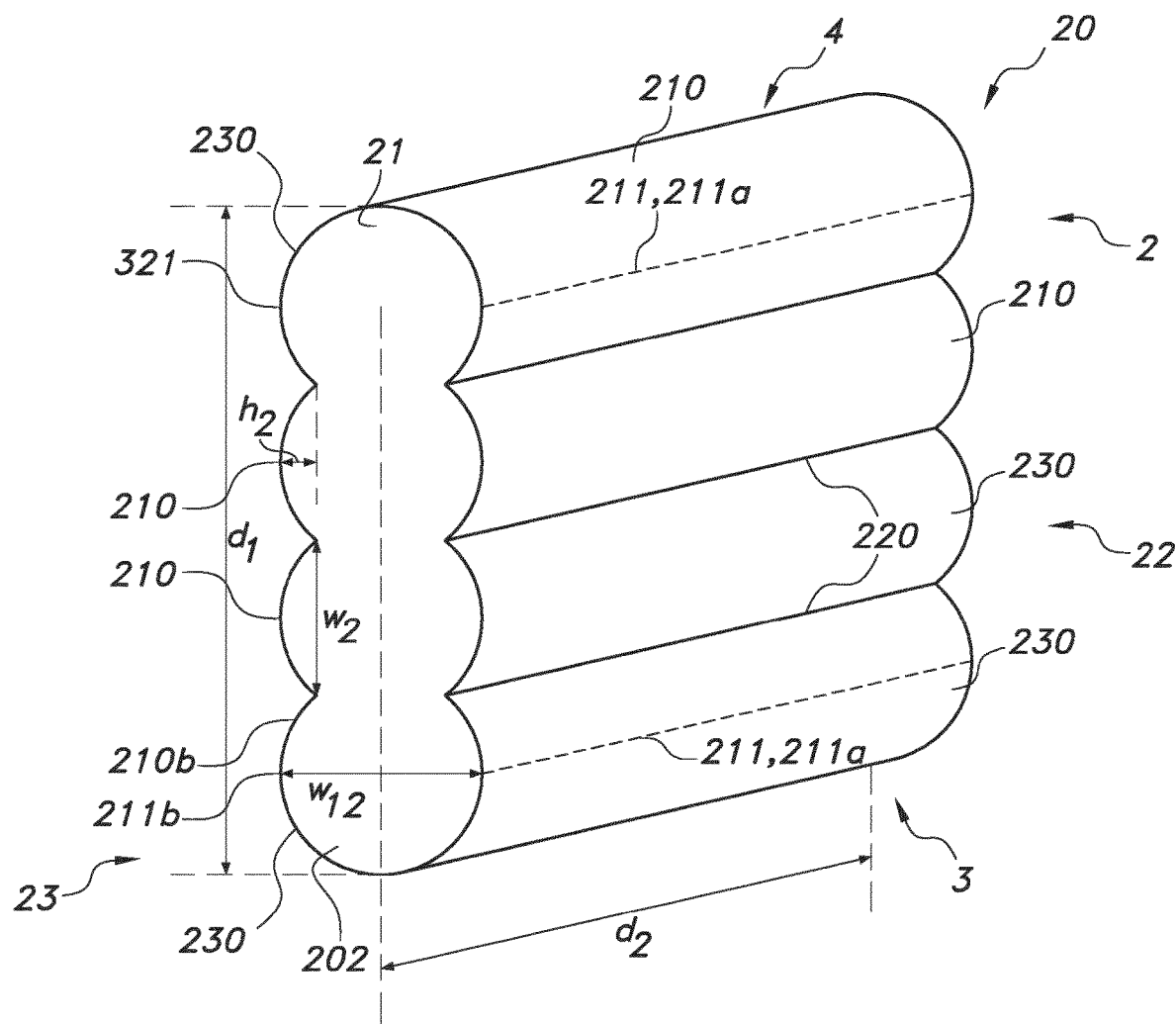

FIG. 2c schematically depicts, in perspective view, a wall 20 of a reflector 2 in some more detail. The reflector 2 comprises a reflector wall 20. The reflector wall 20 comprising a first wall surface 22 and a second wall surface 23 defining the reflector wall 20. The two faces 22,23 are configured opposite of each other and are configured substantially parallel to each other. The reflector wall 20 comprises a light transmissive material 21. The reflector wall 20 has a first dimension dl and a second dimension d2 defining a first reflector wall area A. Each wall surface 22,23 comprises a plurality of parallel arranged elongated corrugations 210. The corrugations have corrugation heights h2 relative to recesses 220 between adjacent corrugations 210 and corrugation widths w2 defined by the distance between adjacent recesses 220 at the respective wall surfaces 22,23. The corrugations 210 have curved corrugation surfaces 230 between said adjacent recesses 220 having corrugation radii r2. Though not shown in FIG. 2c, over at least part of one of the first dimension d1 and the second dimension d2 one or more of (i) the corrugation heights h2, (ii) the corrugation widths w2, (iii) the corrugation radii r2, and (iv) a shortest top-top distance w12 of corrugations tops 211 configured at different wall surfaces 22,23 vary the dimension d1,d2 for at least one of the wall surfaces 22,23, especially both surfaces 22,23. References 3 and 4 indicate a first end 3 and second 4 of the wall, respectively. FIG. 2c schematically depict four corrugations at the first wall surface 22 and the second wall surface 23, respectively. A reflector wall may comprise about 1-100 corrugations/cm over a first dimension (here d1). In FIG. 2c, the corrugations 210 are parallel to the dimension d2. The corrugations 210 have (elongated) corrugations tops 211 and are configured between (elongated) recesses 220. Especially, the variation in one or more parameters is in a direction perpendicular to those elongated structures. This is by way of example in this drawing indicated with the arrow (note that the variation itself is not visible). This variation may thus especially include a gradient in one or more of the corrugation heights, corrugation widths, corrugation radii, and top-top distances over the reflector wall surfaces, especially such gradient in a single direction (parallel to one of the wall dimensions) as schematically depicted here.

Figure 2D:
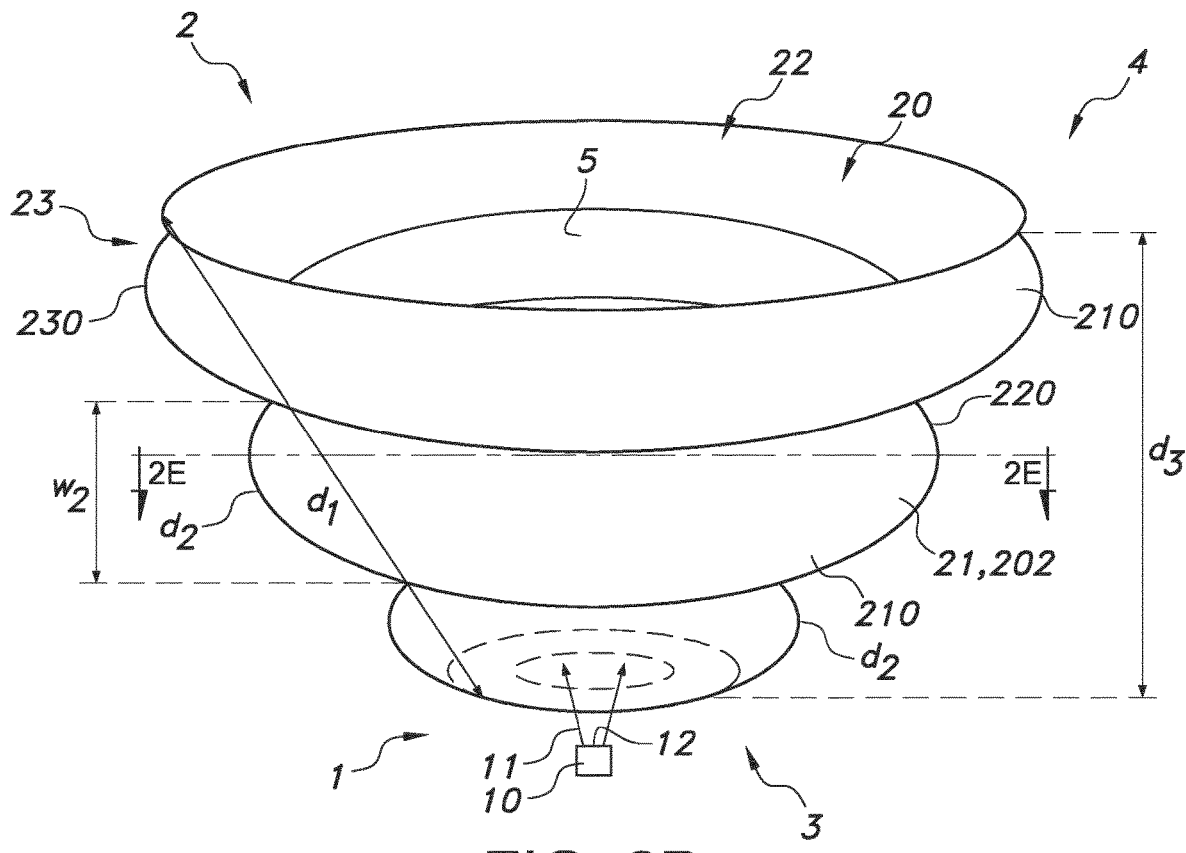
Figure 2E:
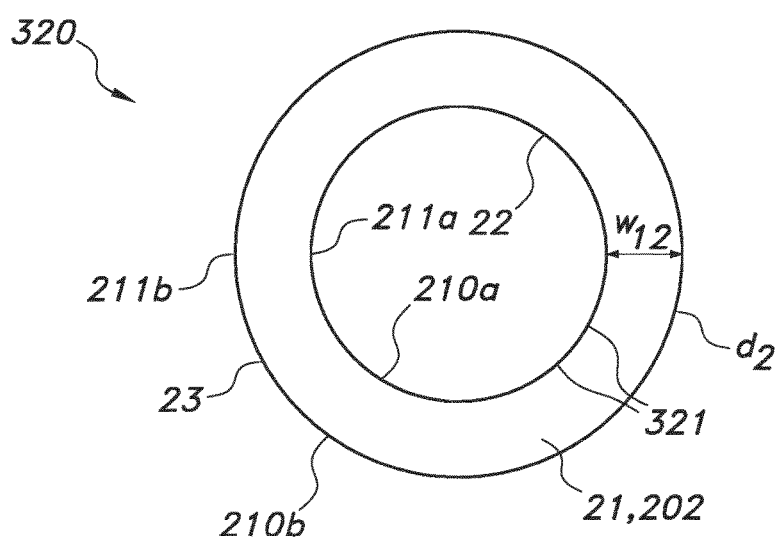

FIG. 2d and FIG. 2e schematically an embodiment wherein the reflector 2 has a first end 3 and a second end 4, wherein a third distance d3 between the first end 3 and the second end 4 is bridged by one or more reflector walls 20, wherein the one or more reflector walls 20 are configured tapering from the second end 4 to the first end 3, and wherein the reflector 2 has a reflector cavity 5. Here, the reflector 2 has a conical shape. FIG. 2d schematically also depicts a lighting system 1 comprising a light source 10 configured to provide light source light 11 and the reflector 2 which is configured to reflect at least part of the light source light 11. Hence, the reflector is configured in a light receiving relationship with the light source. For instance, in the schematically depicted embodiment of FIG. 2d the reflector 2 is configured to collimate at least part of the light source light 11. FIG. 2d also shows that a third distance d3 between the first end 3 and the second end 4 is bridged by one or more reflector walls 20, here in fact a single reflector wall 20, wherein the one or more reflector walls 20 are configured tapering from the second end 4 to the first end 3. The reflector 2 has a reflector cavity 5. Note that the reflector wall 20 of FIG. 2d has a curvature in a first dimension d2 (diameter), but does not necessarily have an overall curvature in the other dimension d1 (length or height of wall 20). The light source 10 comprises a light exit face 12. In the embodiment schematically depicted in FIG. 2d, the light exit face 12 is configured at the first end 3. The light exit face 12 may in embodiments be configured within the cavity 5. Note that not all light source light is necessarily directed to the reflector; in embodiments part of the light source light may also propagate from the light source without coming into contact with the reflector. FIG. 2e schematically depicts a cross-section. Note that d2 may depend upon the distance of the filament 320/curvature 210 from a first end 3 or second end 4.

Figure 2F:
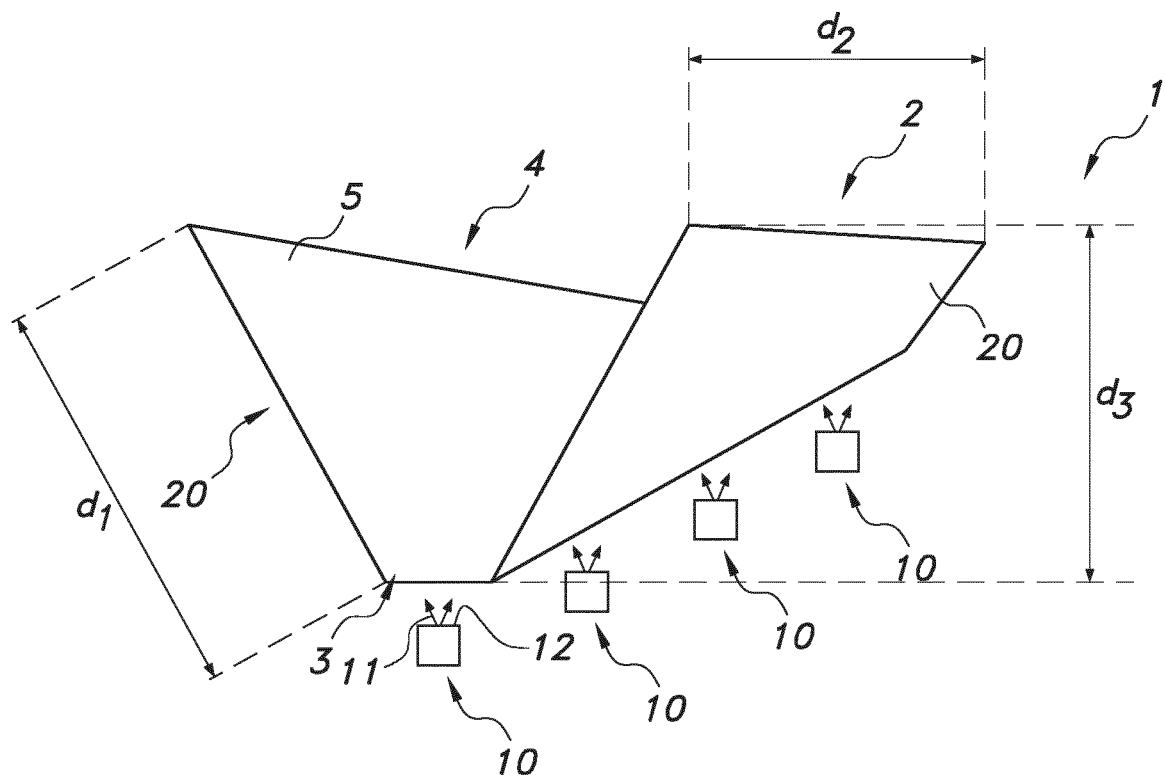

FIG. 2f schematically depicts a perspective view of a V-shape reflector 2. The reflector has a kind of trough shape or hollow triangular shaped prism. Further, FIG. 2f also schematically depicts an embodiment of the lighting system 1. Here, by way of example the lighting system 1 includes a plurality of light sources 10.

Figure 3:
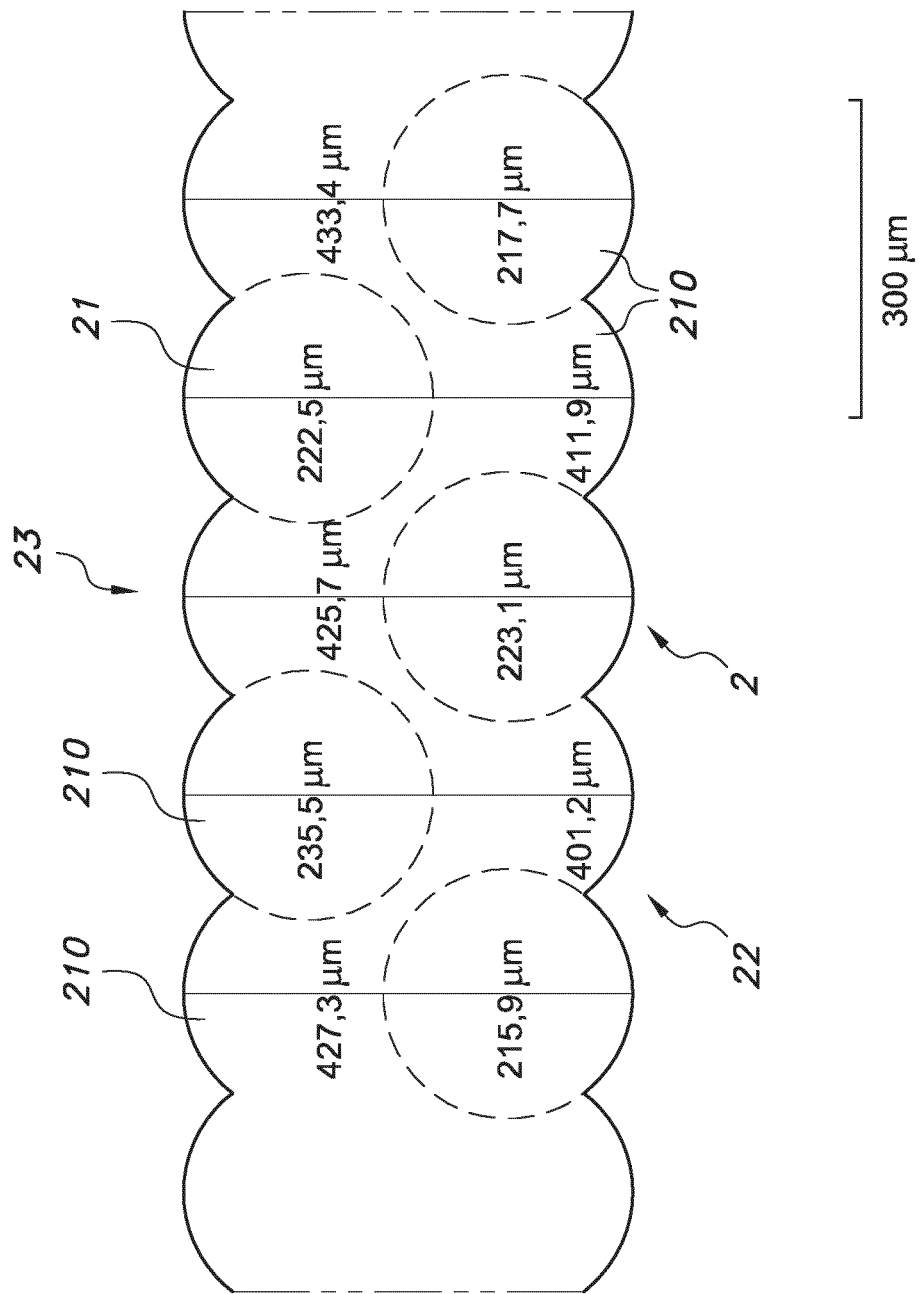
FIGS. 3-8 schematically depict some aspects and variants of the reflector and lighting system.

The printing material may especially be a clear polycarbonate (PC), PET, PLA or PMMA. Also mixture of two or more clear materials may be used as well. A cross section of a 3D print using clear PET is shown in FIG. 3. The printed component is the reflector (or part of a compound reflector) in a LED based luminaire.

Figure 4:
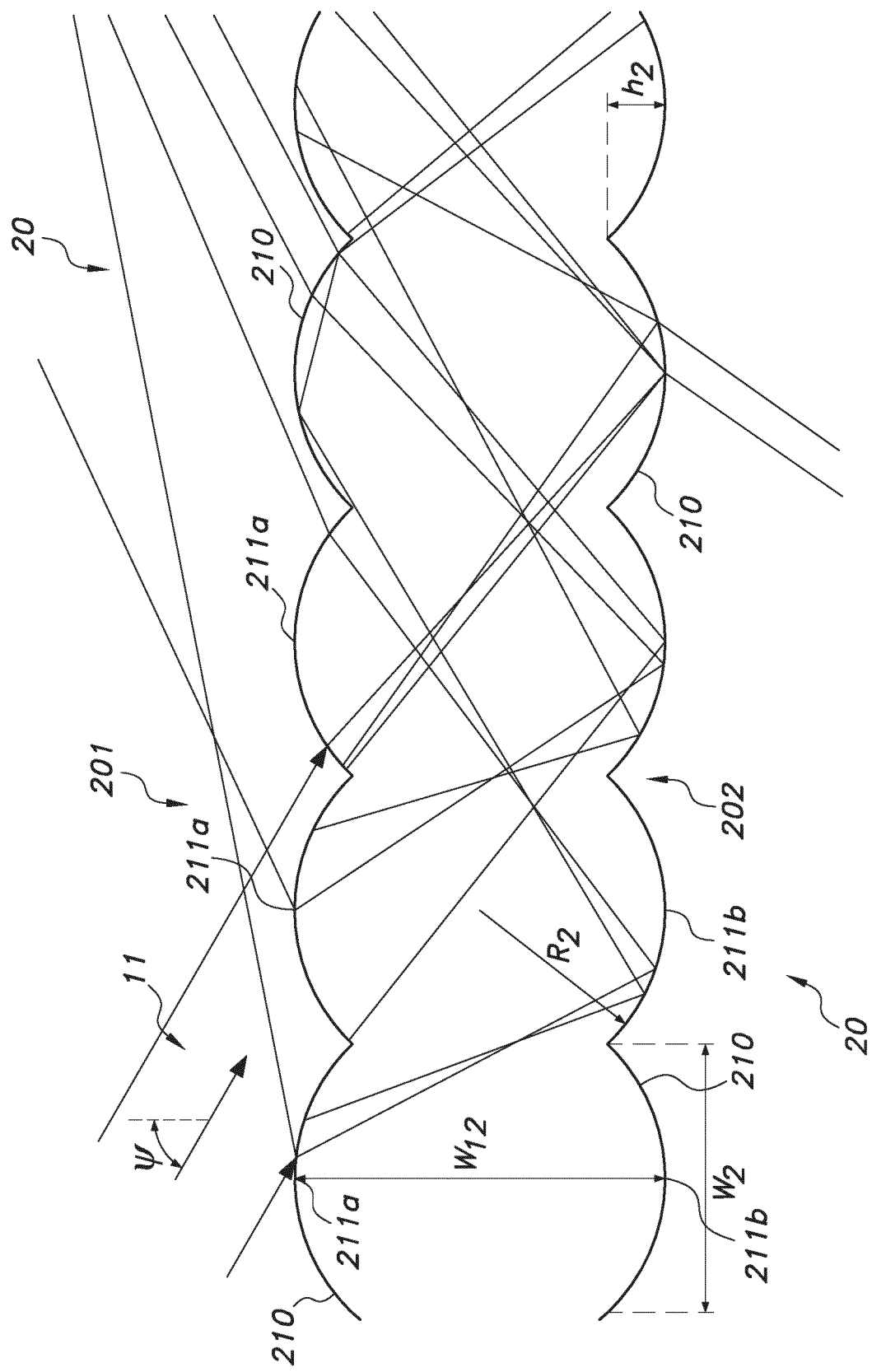

FIG. 4 depicts a ray-tracing example of the reflectivity of the reflector wall 20. Reference $\Psi$ indicates the angle of incidence. Further, from this figure it can also be concluded that at other angles of incidence the dimensions of the corrugations 210 may be different in order to provide the desired directionality and/or angular distribution of the reflected light. Hence, with (a) light source(s) at a fixed position, dependent upon the angle of incidence of the light source light the dimensions of the corrugations 210 may be designed.

Hence, the working principle of the invention is explained in FIG. 4. An incoming light beam is transmitted by the first lens surface and reflected (total internal reflection; TIR) by a second lens surface on the opposite site of the sheet. The second lens is shifted over a distance d with respect to the first lens. The printed structures are defined by the parameters w12, w2, R2 and $\alpha$ (FIG. 2b) and the refractive index n of the polymer.

Figure 5:
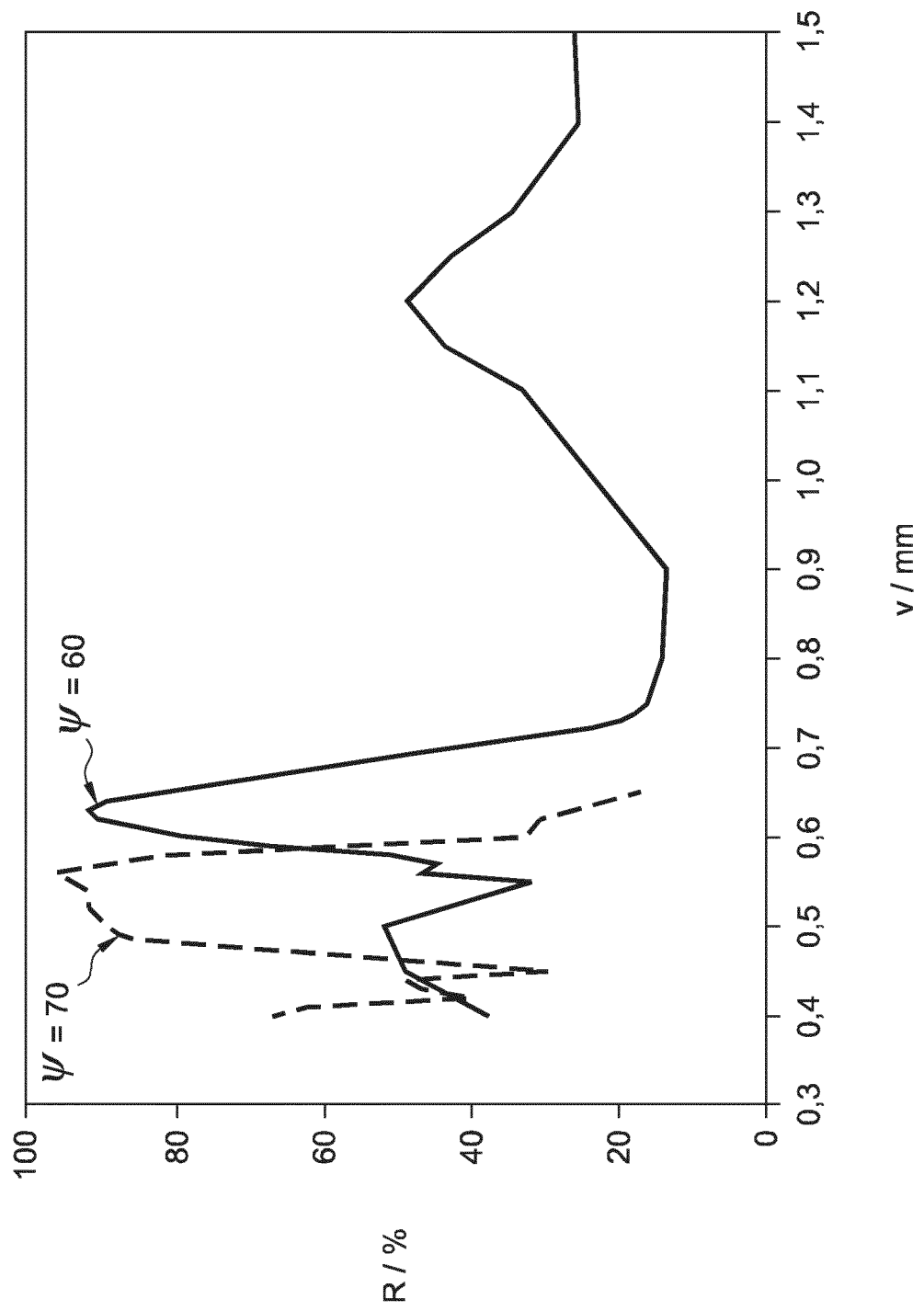

This is also schematically depicted in FIG. 5, wherein the angle of incidence is varied. On the y-axis the reflectivity in % is indicated, on the y-axis v is indicated. Reference v is related to w12 (with v=w12−2*h2). As can be seen in FIG. 5, with tuning the corrugation width w2 from about 0.5 to 0.7 mm the maximum of the reflection can shift the optimal angle of incidence from 70° to 60°. FIG. 5 shows some typical configurations. At around v=0.62 mm, the reflectance of the printed structure becomes ~92% at an angle of incidence $\psi$ of 60° with respect to the normal to the printed sheet surface. At an angle of incidence of 70° structures with v around 0.53 mm show an even higher reflectance of ~95%.

Figure 6:
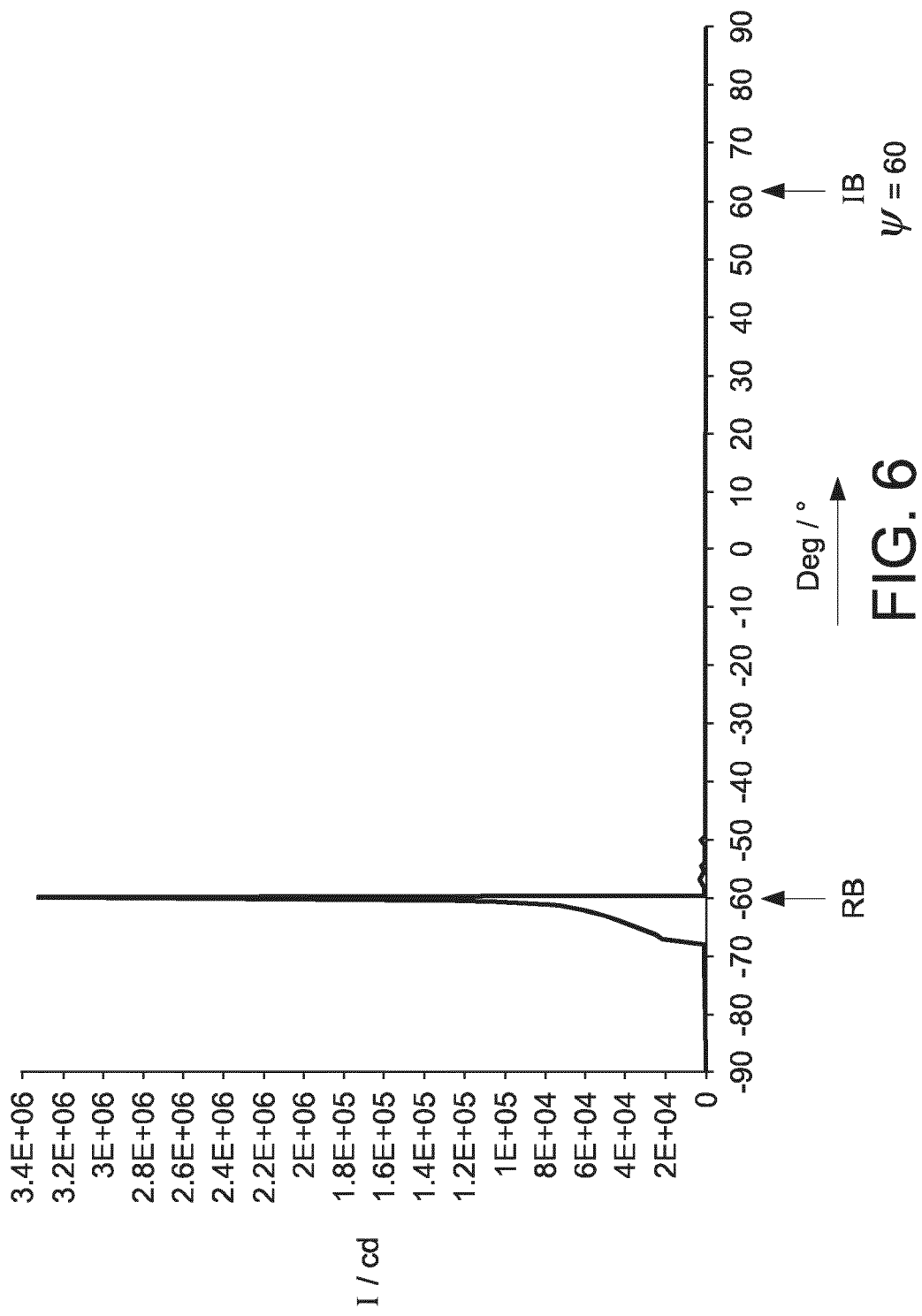

FIG. 6 shows the angular distribution of the reflected beam (at −60°) for a beam with an angle of incidence of 60°. As can be seen, the reflection is substantially specular. FIG. 6 shows that the reflected light is confined in a narrow "cone" of light which is perceived as a specular reflecting/"silverish" surface. "RB" indicates reflected beam and "IB" indicates beam of incidence. The x-axis indicates the angle (°). As can be seen, there is a substantially mirror like reflection with the beam of incidence at about 60° and the reflected beam at −60°.

In FIGS. 4-6, as material polycarbonate with a refractive index of 1.59 was applied, with w2 being 0.6 mm, with r2 being 0.5 mm, and with h2 being 0.1 mm.

Figure 7:
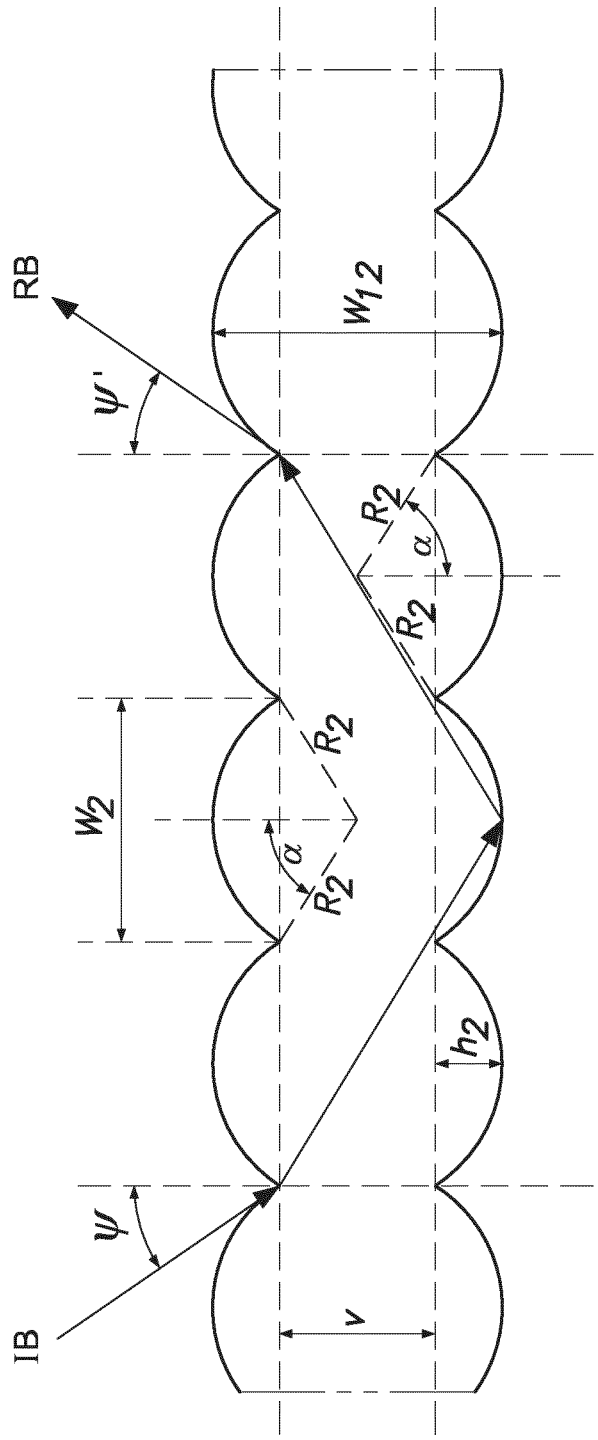

FIG. 7 depicts a simple optical model is depicted, explaining the shape of the structures at which a specular reflection is expected. The model relates geometry of the printed structures to the angle of incidence at which specular reflection occurs.

$\Psi$ is the angle of incidence. The angle $\alpha$ is defined above and can also be defined as arcsin (w2/(2*R2)).

Figure 8:
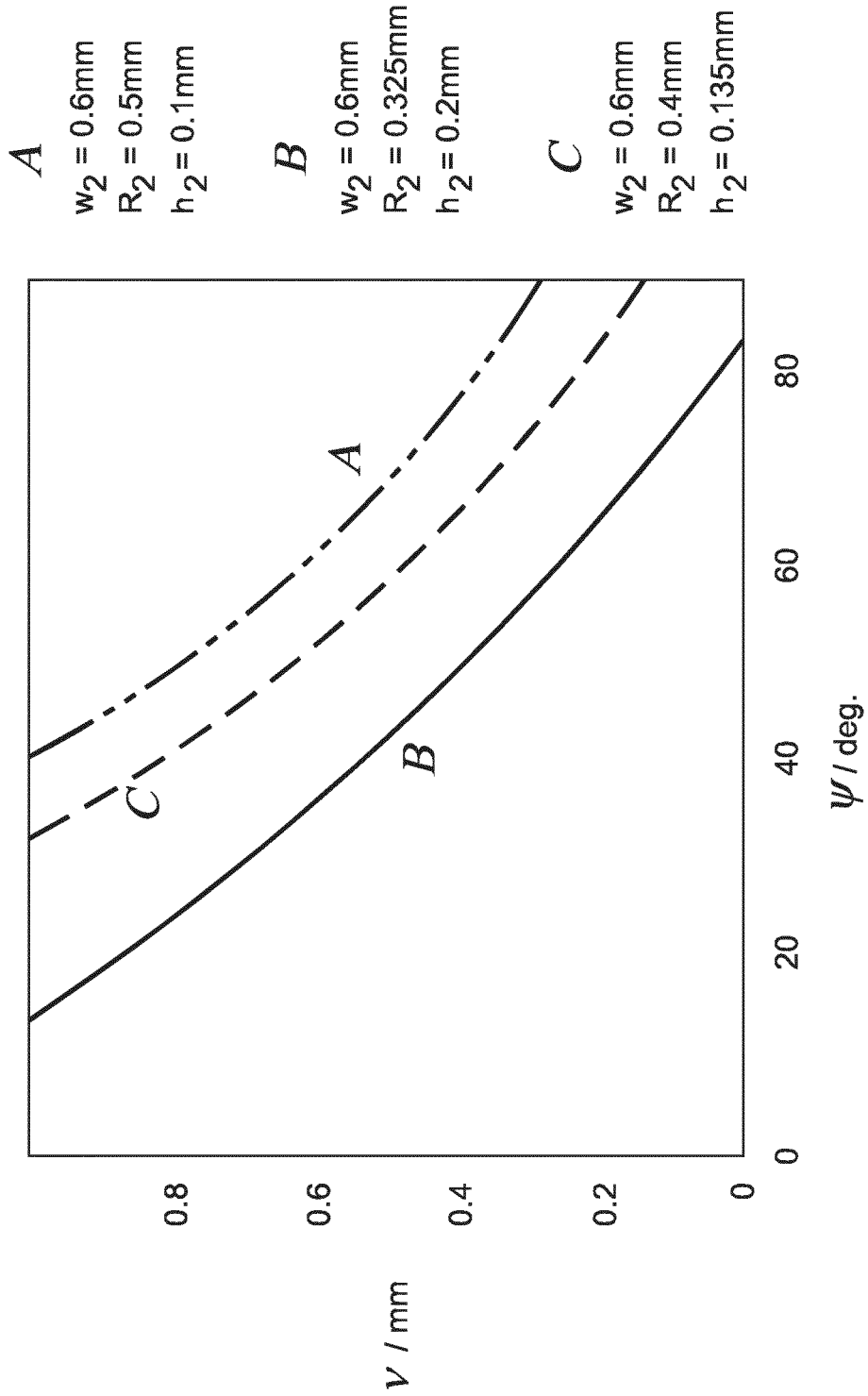

Some results of the model are given in FIG. 8 for three different lens curvatures 1/R and a range of incident angles $\psi$. 3D printed layers have typical dimensions in the range 0.05 mm and 2 mm.

Figure 9A:
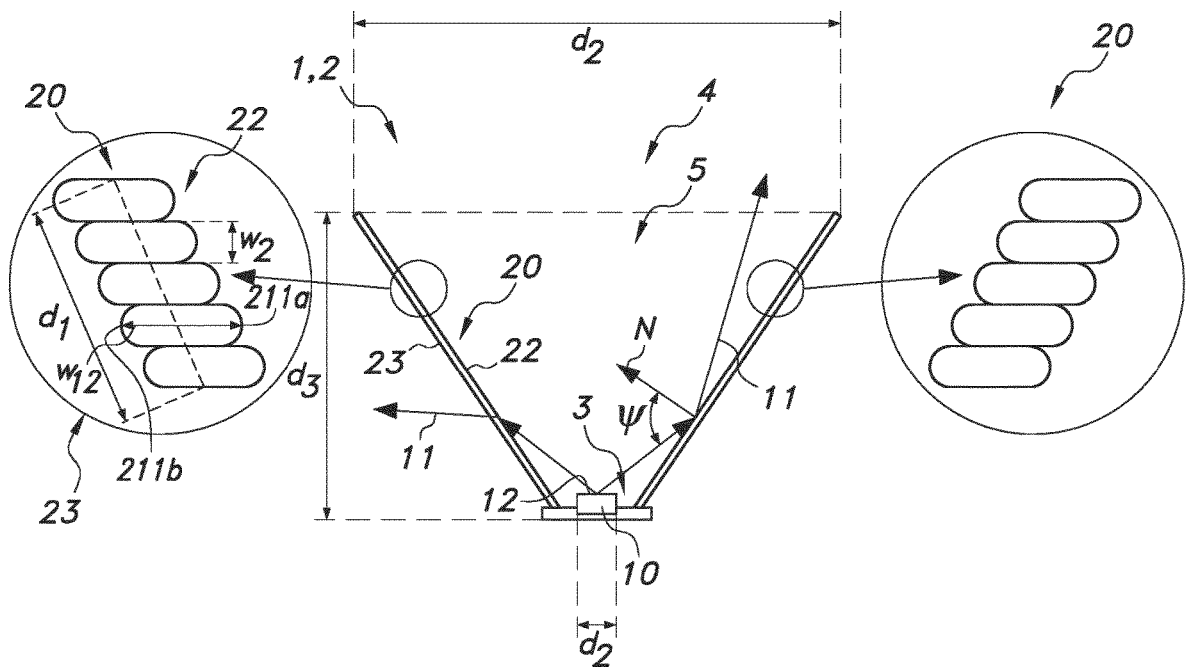
FIGS. 9a-9b and 10a-10b schematically depict some embodiments of the reflector and lighting system.
Figure 9B:
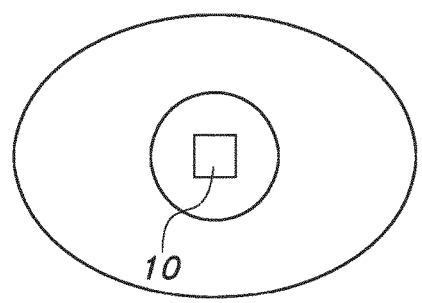

In FIGS. 9a-b, a 3D printed clear reflector is applied to shape the intensity profile of at least one light emitting diode (LED). Because the reflectance of the printed layers is strongly dependent on the incident angle, a small area source is helpful to achieve effective collimation. An attractive source for the described construction is a so-called COB (Chip On Board). These LEDs combine a high flux (typically 500-2500 lm) with a small footprint (<13 mm diameter). Nevertheless, some light leaks through the printed collimator to the outside. However, for many applications, such a reflector is highly appreciated (compare e.g. to the leakage of some light through a reflector of a halogen bulb). In the off-state, the luminaire show a silverish appearance at specific viewing angles. This effect is highly appreciated as well. The complete reflector can have a great variety of geometries (round, linear, free-form). The walls of the reflector can be straight or curved (preferred to optimize reflectance for all incident angles). By manipulating the shape of the reflector, it is possible to tune the amount of reflected and transmitted ("leaked") light and the far-field intensity distribution of the luminaire. The reflector wall 20 comprises first wall surface 22 and second wall surface 23. First wall surface 22 may also be indicated as "cavity surface". Second wall surface 23 may also be indicated as "external surface". FIG. 9a schematically depicts a cross-section of e.g. a conically shaped reflector 2 (see FIG. 2d) or a V-shape reflector 2 (see FIG. 2f). Further, FIG. 9a also schematically depicts an embodiment of the lighting system 1. Here, the cavity 5 is tapering from the second end 4 to the first end 3. As can be derived from FIG. 9a, but also be derived from other drawings, such as 2d, etc., the light source 10 generating rays of light 11 towards the reflector wall 20 provide rays that have a shorter path length to a wall surface 22 and rays that have a longer path length to the (same) wall surface 22.

Figure 10A:
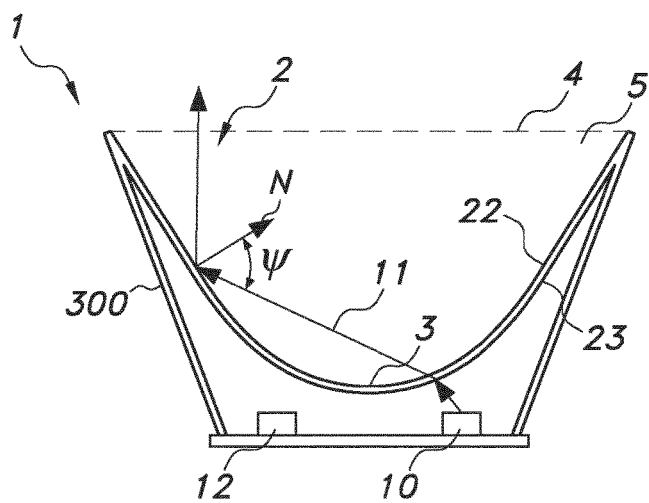
Figure 10B:
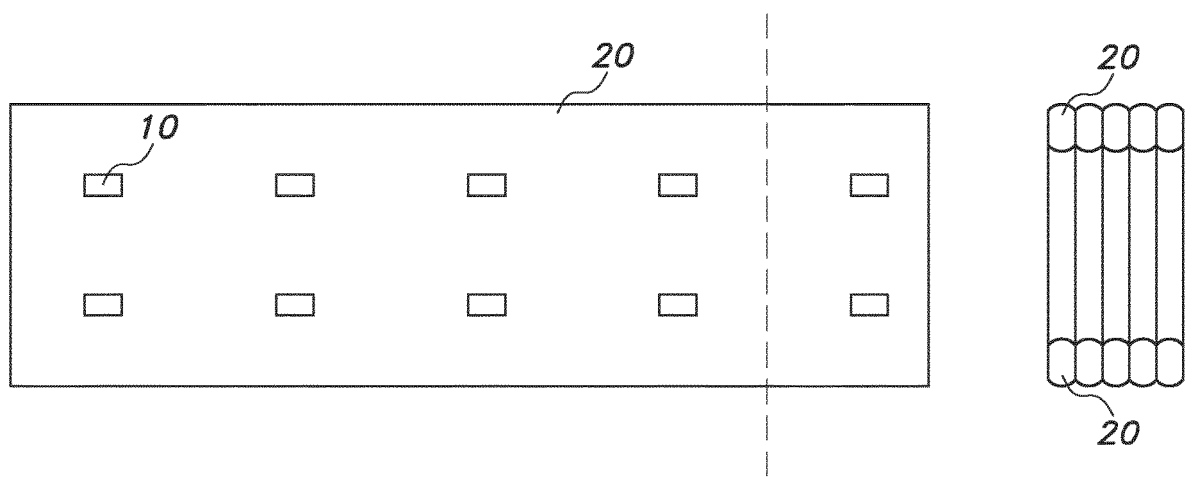

FIGS. 10a-b show an alternative construction in which a clear 3D printed reflector 2 is combined with a reflector 300, such as a white, diffuse reflector or a classical specular reflector (e.g. an aluminum coated polymer). The white reflector can be 3D printed as well. The upper part of the clear polymer element is the reflector, while the lower part (close to the LEDs) may (also) act as diffuser for the light source light 11 of a light source, such as a high brightness LEDs. Such a construction allows also a large variety of forms and shapes. In FIG. 10a, and especially FIG. 10b a linear structure is shown. The polymer reflector can be printed in (at least) two orientations. One option is depicted in FIGS. 10a-b, with FIG. b being a top view of FIG. 10a. Here, the reflector 2 has a kind of U shape, or a V-shape with a rounded first (tapering) end 3.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A reflector comprising a reflector wall, the reflector wall comprising a first wall surface and a second wall surface defining said reflector wall, the reflector wall comprising a light transmissive material, wherein the reflector wall has a first dimension and a second dimension defining a first reflector wall area, wherein each wall surface comprises a plurality of parallel arranged elongated corrugations, wherein the corrugations have corrugation heights relative to recesses between adjacent corrugations and corrugation widths defined by the distance between adjacent recesses at the respective wall surfaces, wherein the corrugations have curved corrugation surfaces between said adjacent recesses having corrugation radii at the respective wall surfaces, and wherein over at least part of one of the first dimension and the second dimension one or more of (i) the corrugation heights, (ii) the corrugation widths, (iii) the corrugation radii, and (iv) a shortest top to top distance of corresponding corrugations tops configured between first and second wall surfaces vary over said wall dimension for at least one of the first and second wall surfaces, wherein the reflector has a first end and a second end, wherein a third distance between the first end and the second end is bridged by one or more reflector walls, wherein the one or more reflector walls are configured tapering from the second end to the first end, and wherein the reflector has a reflector cavity.

2. A reflector comprising a reflector wall, the reflector wall comprising a first wall surface and a second wall surface defining said reflector wall, the reflector wall comprising a light transmissive material, wherein the reflector wall has a first dimension and a second dimension defining a first reflector wall area, wherein each wall surface comprises a plurality of parallel arranged elongated corrugations, wherein the corrugations have corrugation heights relative to recesses between adjacent corrugations and corrugation widths defined by the distance between adjacent recesses at the respective wall surfaces, wherein the corrugations have curved corrugation surfaces between said adjacent recesses having corrugation radii at the respective wall surfaces, and wherein over at least part of one of the first dimension and the second dimension one or more of (i) the corrugation heights, (ii) the corrugation widths, (iii) the corrugation radii, and (iv) a shortest top to top distance of corresponding corrugations tops configured between first and second wall surfaces vary over said wall dimension for at least one of the first and second wall surfaces, wherein the reflector has a first end and a second end, wherein a third distance between the first end and the second end is bridged by one or more reflector walls, wherein the one or more reflector walls are configured tapering from the second end to the first end, and wherein the reflector has a reflector cavity, wherein the reflector wall is a fused deposition modeling printed reflector wall and wherein the corrugations are defined by filament surfaces.

3. The reflector according to claim 1, wherein the reflector wall comprises one or more of PC, PET, PLA and PMMA.

4. A reflector comprising a reflector wall, the reflector wall comprising a first wall surface and a second wall surface defining said reflector wall, the reflector wall comprising a light transmissive material, wherein the reflector wall has a first dimension and a second dimension defining a first reflector wall area, wherein each wall surface comprises a plurality of parallel arranged elongated corrugations, wherein the corrugations have corrugation heights relative to recesses between adjacent corrugations and corrugation widths defined by the distance between adjacent recesses at the respective wall surfaces, wherein the corrugations have curved corrugation surfaces between said adjacent recesses having corrugation radii at the respective wall surfaces, and wherein over at least part of one of the first dimension and the second dimension one or more of (i) the corrugation heights, (ii) the corrugation widths, (iii) the corrugation radii, and (iv) a shortest top to top distance of corresponding corrugations tops configured between first and second wall surfaces vary over said wall dimension for at least one of the first and second wall surfaces, wherein the reflector has a first end and a second end, wherein a third distance between the first end and the second end is bridged by one or more reflector walls, wherein the one or more reflector walls are configured tapering from the second end to the first end, and wherein the reflector has a reflector cavity, comprising sets of corrugations with a first corrugation at the first wall surface and a second corrugation at the second wall surface with said shortest top-top distance between a first corrugation top of the first corrugation at the first wall surface and a second corrugation top of the second corrugation at the second wall surface selected from the range of 0.01≤(corrugation height)/(top to top distance of corresponding corrugations tops configured between first and second wall surfaces)≤100.

5. The reflector according to claim 1, wherein the reflector has an elongated V-shape or has a conical shape.

6. A lighting system comprising a light source configured to provide light source light and a reflector according to claim 1, wherein the reflector is configured to reflect at least part of the light source light.

7. The lighting system according to claim 6, wherein the reflector is configured to collimate at least part of the light source light.

8. The lighting system according to claim 6, wherein the reflector has a first end and a second end, wherein a third distance between the first end and the second end is bridged by one or more reflector walls, wherein the one or more reflector walls are configured tapering from the second end to the first end, and wherein the reflector has a reflector cavity.

9. The lighting system according to claim 8, wherein the light source comprises a light exit face, and wherein the light exit face is configured at the first end or wherein the light source is configured to provide said light source light into said cavity through one or more reflector walls.

10. The lighting system according to claim 6, further comprising a second reflector configured to redirect at least part of light source light that escapes through one or more reflector walls back through the one or more walls into said reflector cavity.

* * * * *